Patented Apr. 17, 1928.

1,666,696

UNITED STATES PATENT OFFICE.

ROBERT GRIESSBACH AND JULIUS EISELE, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

PROCESS FOR UTILIZATION OF LIGNIN.

No Drawing. Application filed October 18, 1927, Serial No. 227,049, and in Germany October 22, 1926.

Lignin or substances rich in lignin such as the residues obtained when acting on wood with acids, for example, in the production of sugar by treating wood with concentrated hydrochloric acid could not hitherto be employed for useful purposes. Whilst lignin remains unaltered when exposed to the action of chemical reagents under mild conditions, it is usually decomposed into a number of products of low molecular weight without any commercial value by strongly acting reagents.

We have now found that valuable products are obtained from lignin or substances rich in lignin, avoiding any decomposition, when separating the said material by treatment with organic halogen containing solvents, i. e. solvents containing one or more halogen atoms in the molecule, into a portion soluble in said solvents and another portion insoluble therein. Among the said solvents ethylenechlorhydrine is particularly suitable for the said treatment. The colored components of the lignin containing material are dissolved in solvents of the said kind, while a nearly colorless material of cellular structure remains.

The following example will further illustrate how the present invention may be carried out in practice but the invention is not restricted thereto.

Example.

Very finely ground lignin obtained by treating wood meal with hydrochloric acid of 40 per cent strength, is treated at about 100° C. with ethylenechlorhydrine, suitably in an extraction apparatus or in an apparatus provided with a stirring mechanism, until the undissolved portion remains colorless after filtration of the dark brown solution. By evaporating the solvent from the resulting solution, which may be effected in vacuo if desired, a bituminous product is obtained which contains inter alia the valuable vanillin in a considerably increased amount with respect to the initial material; the vanillin can be recovered from the evaporation residue for instance by sublimation. The separated solvent may of course be used again for further extractions or as washing liquid.

The bituminous residue may be employed in the production of artificial resins, as a coating material, or binding agent, for example when pressing artificial masses, or for similar purposes. Lasting emulsions of bitumen may be obtained by mixing the solution of the bitumen in the organic halogen-containing solvent with liquids in which the bitumen is insoluble and subsequently distilling off or otherwise removing the halogen-containing solvent.

The colorless substance of cellular structure remaining undissolved may immediately be used as filling material for artificial masses.

What we claim is:

1. A process for recovering useful products from material rich in lignin which consists in extracting the said material with an organic halogen-containing solvent.

2. A process for recovering useful products from material rich in lignin which consists in extracting the said material with ethylenechlorhydrine.

3. A process for recovering useful products from material rich in lignin which consists in extracting the said material with ethylenechlorhydrine, evaporating the latter and recovering vanillin from the evaporation residue by sublimation.

4. A process for recovering useful products from the residues obtained by treating wood with strong hydrochloric acid which consists in extracting the said material with ethylenechlorhydrine, evaporating the latter and recovering vanillin from the evaporation residue by sublimation.

In testimony whereof we have hereunto set our hands.

ROBERT GRIESSBACH.
JULIUS EISELE.